United States Patent [19]

Takano et al.

[11] Patent Number: 5,008,505
[45] Date of Patent: Apr. 16, 1991

[54] SELF-RESETTING PUSH SWITCH

[75] Inventors: Tsunesuke Takano; Kouichi Shinzawa, both of Tokyo, Japan

[73] Assignee: Daiichi Denso Buhin Co., Ltd., Tokyo, Japan

[21] Appl. No.: 494,467

[22] Filed: Mar. 16, 1990

[30] Foreign Application Priority Data

Mar. 22, 1989 [JP] Japan ................................ 1-32225[U]

[51] Int. Cl.[5] ............................................. H01H 13/52
[52] U.S. Cl. .................................. 200/531; 200/61.76; 200/302.2; 200/345; 200/260
[58] Field of Search ................ 200/61.76, 61.86, 61.62

[56] References Cited

U.S. PATENT DOCUMENTS

| | | | |
|---|---|---|---|
| 2,899,511 | 8/1959 | Fraser | 200/61.81 |
| 3,104,300 | 9/1963 | Hutt | 200/531 |
| 3,172,981 | 3/1965 | Loesch | 200/531 |
| 3,476,900 | 11/1969 | Sharples | 200/257 |
| 3,710,048 | 1/1977 | Schmacher | 200/61.81 X |
| 3,818,169 | 6/1974 | Kobernus | 200/531 |
| 4,298,778 | 11/1981 | Beresford-Jones | 200/302.2 |
| 4,467,160 | 8/1984 | Murmann et al. | 200/536 |
| 4,778,965 | 10/1988 | Valenzona | 200/296 |
| 4,874,912 | 10/1989 | Kakuta et al. | 200/531 X |

FOREIGN PATENT DOCUMENTS

| | | | |
|---|---|---|---|
| 25629 | 3/1981 | European Pat. Off. | 200/536 |
| 2601206 | 7/1977 | Fed. Rep. of Germany | 200/531 |
| 2046996 | 11/1980 | United Kingdom | 200/341 |

OTHER PUBLICATIONS

"New Audio Encyclopedia", Japanese publication, with translation of portion of page 79 (no date).

*Primary Examiner*—Ernest G. Cusick
*Attorney, Agent, or Firm*—Nixon & Vanderhye

[57] ABSTRACT

A self-resetting push switch includes a closed-end insulating housing having first and second pairs of opposing inner wall surfaces. First grooves are formed on the first pair of surfaces, while a second groove having a projection is formed on at least one of the second pair of surfaces. First and second movable contact pieces project outwardly from a sliding sleeve being integral with an operation rod and having at least one engagement piece engageable with the projection of the second groove. The movable contact pieces are capable of coming into sliding contact with a first stationary contact piece inserted in one of the first grooves, and a second stationary contact piece.

8 Claims, 6 Drawing Sheets

SELF-RESETTING PUSH SWITCH

BACKGROUND OF THE INVENTION

The present invention relates to a push switch, and more specifically, to a self-resetting push switch that can be assembled easily and efficiently.

Conventional self-resetting push switches are shown in, for example, Denpa Shinbun "Special Edition on Switches" (issued on Mar. 24, 1980), and "The Latest Audio Encyclopedia" (published by Radio Gijutsusha).

The prior art push switches shown in these publications are switches which are operated vertically relative to their main bodies.

Among switches having this arrangement, single acting type and interlocking type switches (in which a plurality of switches form a block structure) are well-known.

A switch of either the single-acting or interlocking type generally comprises movable contacts moving as a switch rod, and a housing holding the switch rod and accommodating stationary contact members. In addition a spring is provided to limit the range of movement of the switch rod and to return it to a "normal" position.

It has recently been regarded as of importance to reduce the size and weight of push switches in order to make them more suitable for mounting or assembly by users.

Manufacturers have therefore improved the level of reliability and operability for such push switches. As a consequence, the total number of the component parts has increased, and the efficiency of assembly by the manufacturers has decreased. When low efficiency of assembly is combined with increase in material and labor costs, the prices of such push switch products may increase, which, in turn, may weaken the competitive power of the manufacturers in the international market.

SUMMARY OF THE INVENTION

The present invention is directed towards eliminating the above-described problems. Thus, an object of the present invention is to provide a self-resetting push switch whose assembly does not need screws (that may increase the total number of component parts) or soldering (that may increase the total number of assembly processes), and whose various component parts are inserted into others utilizing the resilience of the materials they are formed of, thereby enabling easier and more efficient assembly without degrading reliability and operability.

A self-resetting push switch according to the present invention therefore comprises: a closed-end insulating housing having two respective pairs of first and second opposing inner wall surfaces; first grooves formed on the first pair of the opposing inner wall surfaces; a second groove formed on at least one of the second pair of the opposing inner wall surfaces, the second groove having a projection formed therein; a first stationary contact piece inserted in one of the first grooves; first and second movable contact pieces, the first movable contact piece being capable of coming into sliding contact with the first stationary contact piece; an operation rod having a sliding sleeve integral therewith, the first and second movable contact pieces projecting outwardly from the sliding sleeve, the sliding sleeve having at least one engagement piece engageable with the projection within the second groove; a spring interposed between the bottom surface of the housing and the lower surface of the sliding sleeve, the spring always urging the operation rod in such a manner that part of the operation rod always projects from the housing; and a pair of conductive and resilient fixing pieces having a second stationary contact piece capable of coming into sliding contact with the second movable contact piece, the conductive and resilient fixing pieces being disposed in such a manner as to bridge two opposing positions on the upper portion of the housing.

The self-resetting push switch according to the present invention operates in the following manner. Normally, the movable contact pieces are kept in contact with the corresponding stationary contact pieces. When the operation rod is pushed down against the force of the spring, one of the movable contact pieces is released from its contact with the associated stationary contact piece, thereby disconnecting the electrical connection between the two stationary contact pieces. Thereafter, when the force applied to the operation rod to push it down is released, the force of the spring causes the movable contact pieces and the operation rod to ascend to return to their normal position. Following this action, the two stationary contact pieces are electrically connected with each other through the movable contact pieces, and the circuit is closed.

One of the two stationary contact pieces, more specifically, the second stationary contact piece, is formed as being integral with the pair of conductive and resilient fixing pieces. Therefore, grounding of e.g. the body of a vehicle can be achieved through the conductive and resilient fixing pieces, and the contact piece need not be fixed to the body by screws.

BRIEF DESCRIPTION OF THE DRAWINGS

The accompanying drawings illustrate one embodiment of the present invention, in which.

DESCRIPTION OF THE PREFERRED EMBODIMENT

One embodiment of the present invention will now be described with reference to the drawings.

Figure 1:
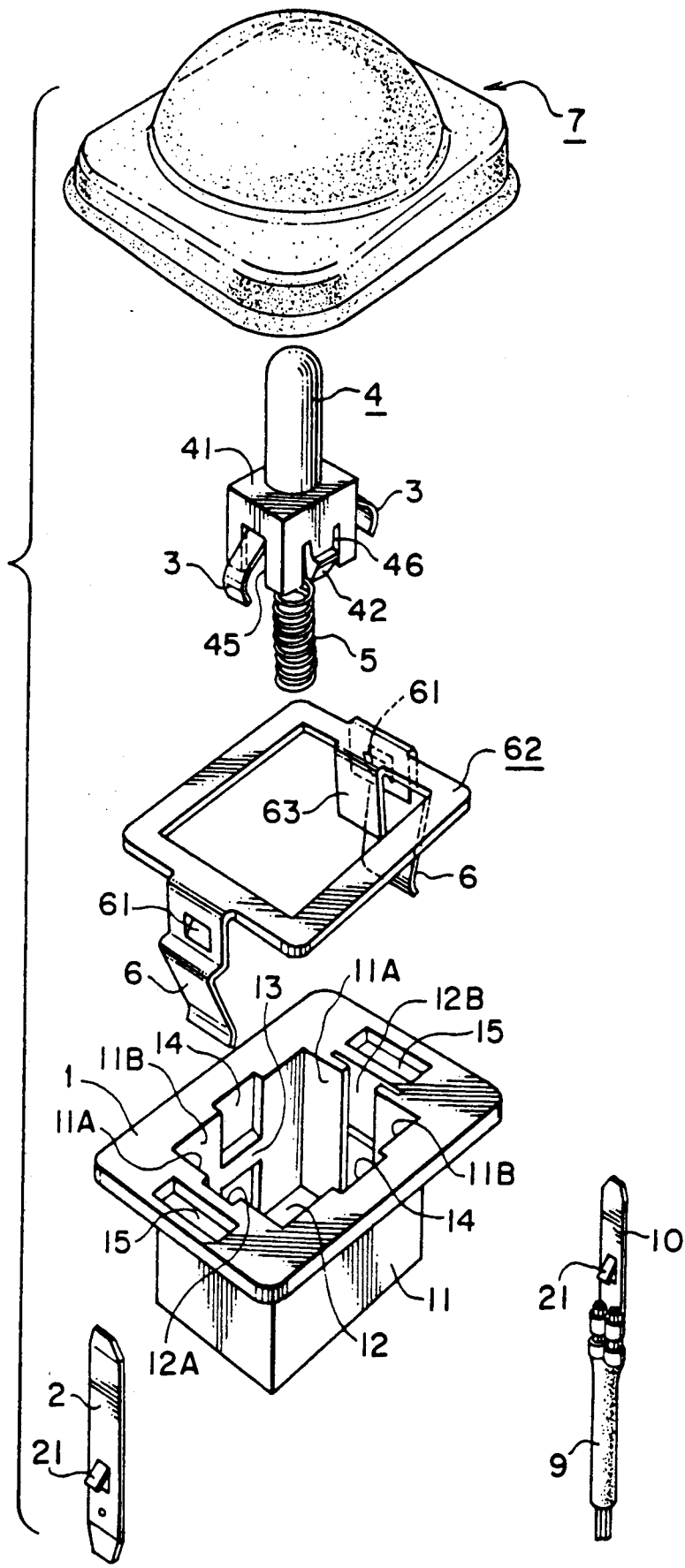
FIG. 1 is an exploded perspective view of a self-resetting push switch.

A push switch according to one embodiment of the present invention mainly comprises, as shown in FIG. 1, a housing 11, a first stationary contact piece 2, a movable contact member including movable contact pieces 3, operation rod 4, a spring 5, a frame 62 including a second stationary contact piece 63, and a waterproof cap 7.

Figure 5:
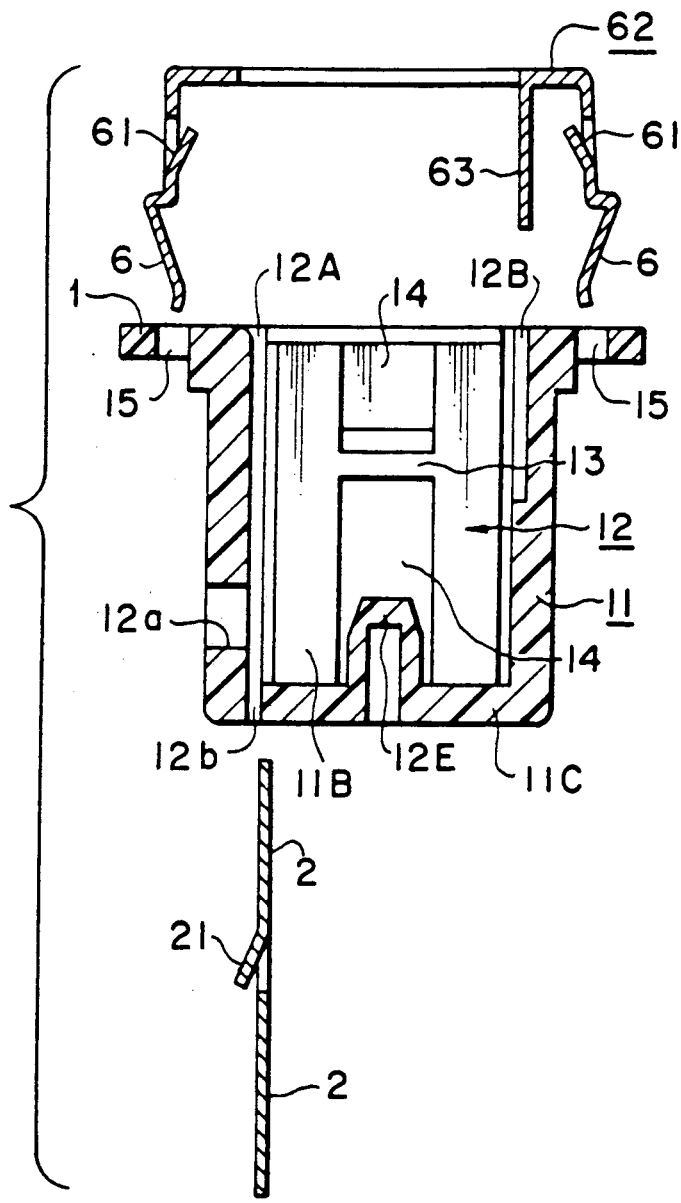
FIG. 5 is an enlarged and exploded vertical section of the assembly shown in FIG. 4.
Figure 6:
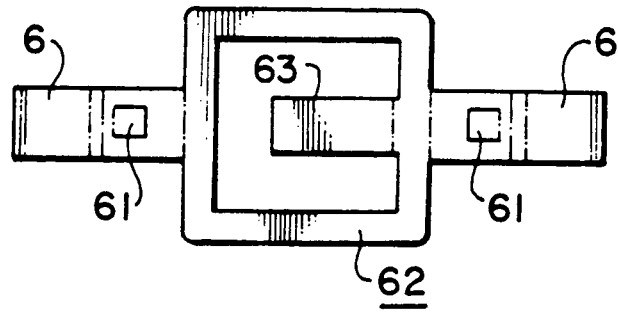
FIG. 6 is an exploded view of a member including the conductive and resilient fixing pieces.
Figure 7:
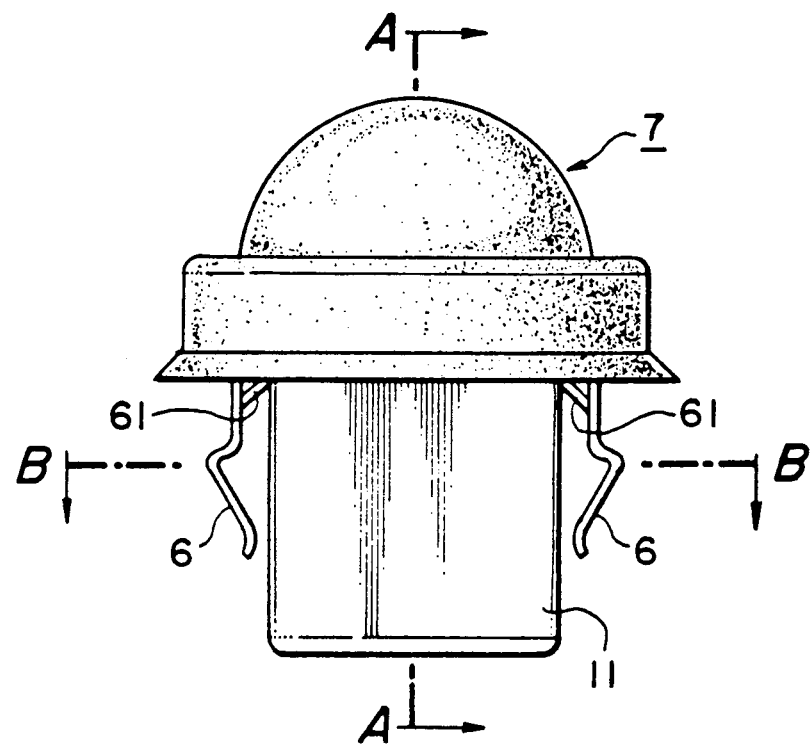
FIG. 7 is a plan view of the push switch as a finished product.
Figure 8:
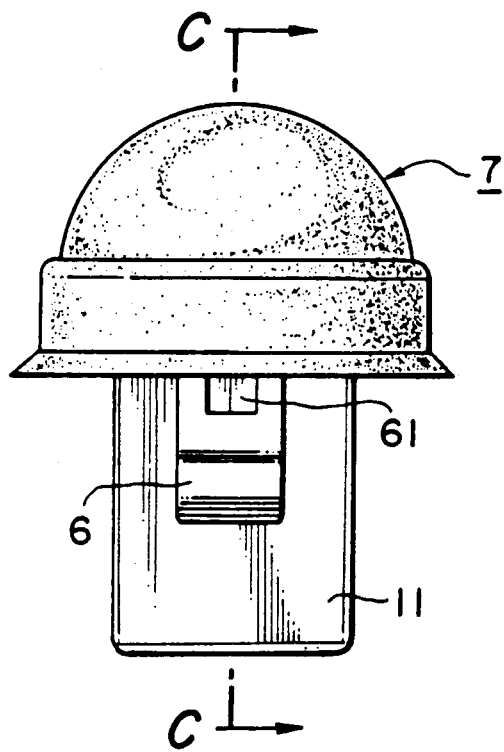
FIG. 8 is a left side view of the push switch shown in FIG. 7.
Figure 9:
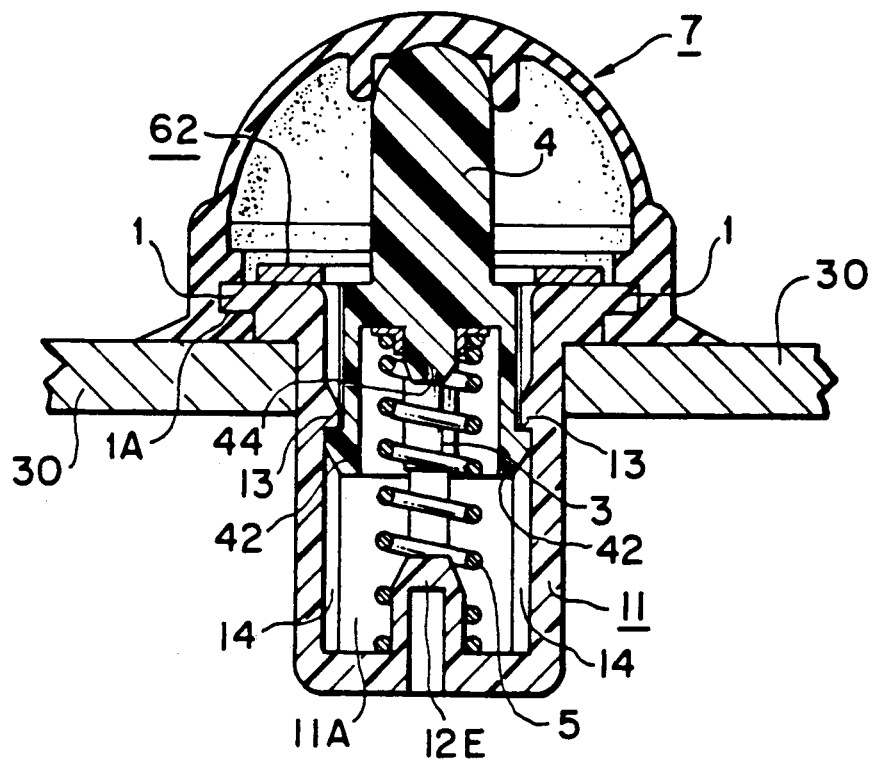
FIG. 9 is an enlarged section taken along the line A—A shown in FIG. 7.

The housing 11 has an insulating base 1 which is formed by molding plastic material, as shown in FIGS. 1, 5 and 9. The housing 11 has a closed-end angular cylindrical configuration with a cavity 12 defined by two pairs of opposing inner wall surfaces 11A and 11B. One pair of opposing inner wall surfaces 11A have grooves 12A and 12B formed thereon. Grooves 14 are formed on the other pair of opposing inner wall surfaces 11B, and have projections 13 formed at an intermediate height thereof Each projection 13 has an upper sloped surface and a lower horizontal surface. A pair of engagement holes 15 are formed through upper portions of the housing 11.

Figure 4:
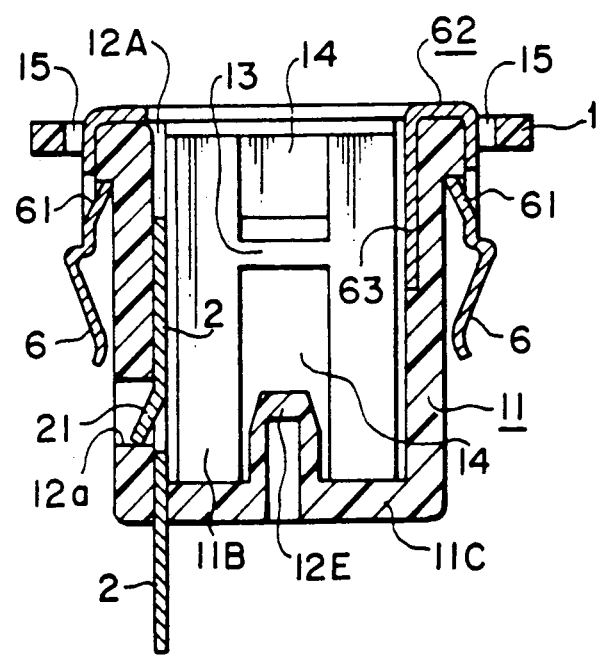
FIG. 4 is an enlarged vertical section of another assembly in which a stationary contact piece and a pair of conductive and resilient fixing pieces are mounted on a housing.
Figure 11:
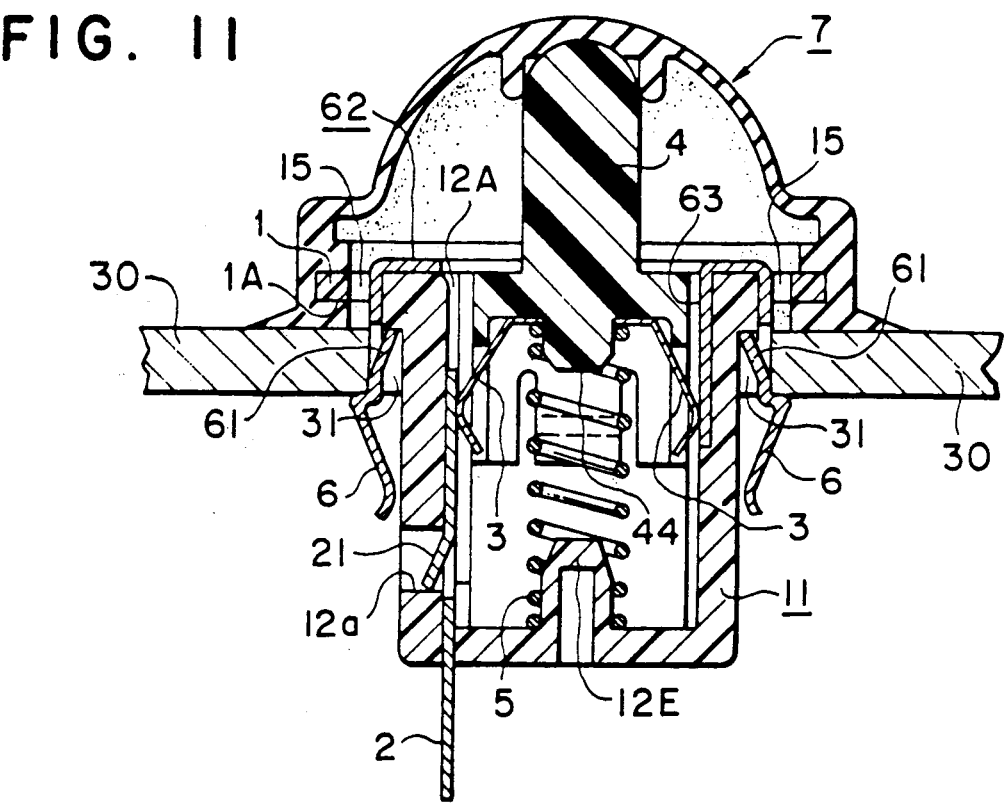
FIG. 11 is an enlarged section taken along the line C—C shown in FIG. 8.

The first stationary contact piece 2 has an engagement pawl 21 engageable with an engagement stepped portion 12a' of the groove 12A formed on the inner wall surface 11A of the housing 11. The stationary contact piece 2 is inserted into the housing 11 through the open lower end 12b' of groover 12A and is fixed to the housing 11 by bringing the pawl 21 into engagement with the portion 12a', as shown in FIGS. 4 and 11. A lower portion of the contact piece 2 allows a lead to be extended therefrom.

Figure 3:
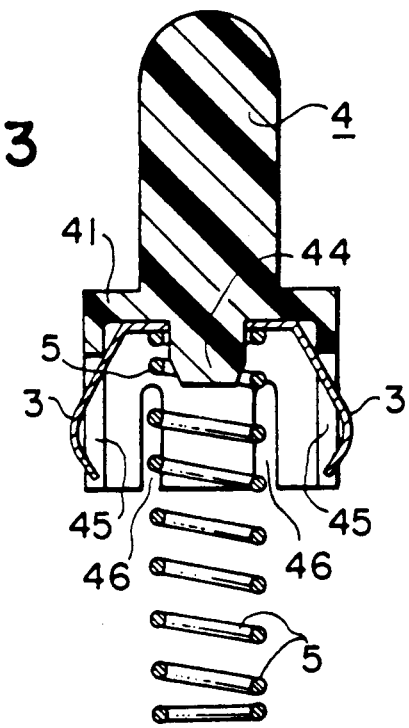
FIG. 3 is an enlarged vertical section of an assembly in which movable contact pieces and a spring are mounted on a sliding sleeve.

One of the movable contact pieces 3 is capable of coming into sliding contact with the first stationary contact piece 2, and the other with the second stationary contact piece 63. The movable contact pieces 3 are formed of a conductive and elastic material, and they have a flattened and inverted V-shape .The operation rod 4 has a sliding sleeve 41 formed integrally with a lower portion of the rod 4 and provided with a projection end 44. The movable contact pieces 3 are deposed in such a manner as to project outwardly through notches 45 of the sleeve 41, as shown in FIGS. 1, 3 and 11. A pair of resilient engagement pieces 42 are formed on the sliding sleeve 41, as shown in FIGS. 1, 9, 10 and 11. The engagement pieces 42 respectively have one each of sloped surfaces an horizontal surfaces, and they are engageable with the projections 13 within the grooves 14. Slits 46 are formed to allow the engagement pieces 42 to exhibit resilience.

Figure 10:
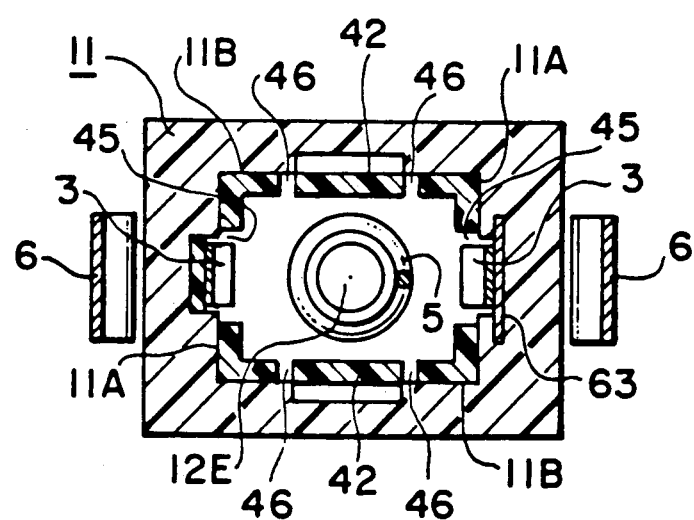
FIG. 10 is an enlarged section taken along the line B—B shown in FIG. 7.

Part of the operation rod 4 is always projected from the cavity 12 by a spring 5 interposed between the bottom 11C of the housing 11 and the lower surface of the sliding sleeve 41, as shown in FIGS. 1 and 3. The sliding sleeve 41 is slidable inside the cavity 12 along the grooves 14, and the resilient engagement pieces 42 can be pushed down below the projections 13, as shown in FIGS. 9, 10 and 11.

Although two resilient engagement pieces 42 are provided in the illustrated embodiment, only one resilient engagement piece may be provided.

As shown in FIGS. 1, 4, 5 and 6, a pair of conductive and resilient fixing pieces 6 is formed on two opposite sides of the frame 62, and they have a pair of engagement pawls 61 engageable with the engagement holes 15. The second stationary contact piece 63 has a length corresponding to about one half of the depth of the cavity 12. As shown in FIGS. 9 and 11, the conductive and resilient fixing pieces 6 are mounted on the housing 11 with their engagement pawls 61 kept in engagement with the holes 15, while the stationary contact piece 63 is kept in engagement with the groove 12B formed in the associated inner wall surface 11A of the housing 11.

Figure 2:
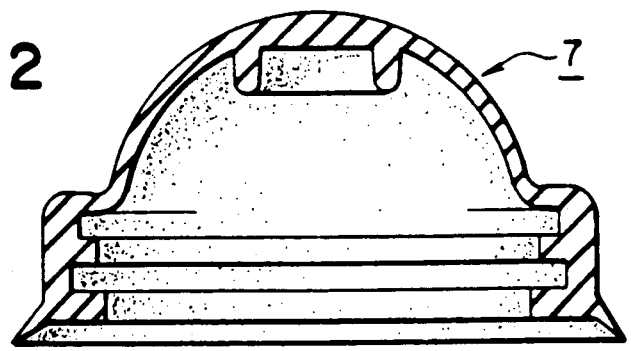
FIG. 2 is an enlarged vertical section of a waterproof cap.

The flexible waterproof cap 7 shown in FIGS. 1 and 2 is disposed on the outer edge of the insulating base 1, as shown in FIGS. 9 and 11 in case such is required depending on the location of use. When the cap 7 is employed, the switch serves as a waterproof self-resetting push switch.

If the stationary contact piece 2 is substituted by a known tab terminal 10 having a lead 9, shown in FIG. 1, its connection with an external circuit is facilitated.

The housing 11 and the operation rod 4 are formed of insulating material such as synthetic resin that can be poured into a mold. The stationary contact piece 2, the movable contact pieces 3, the conductive and resilient fixing pieces 6, the spring 5, and the stationary contact piece 63 are formed of metal material. In particular, the stationary contact piece 2 and the movable contact piece 3 are formed of elastic and highly conductive materials, such as phosphor bronze.

The waterproof cap 7 is formed of soft rubber.

The self-resetting push switch according to the present invention comprises the above-described component parts.

The switch is assembled in the following manner:

First, as shown in FIGS. 1, 3 and 4, the movable contact member is inserted into the sliding sleeve 41 of the operation rod 4 in such a manner that the movable contact pieces 3 project outwardly through the notches 45 of the sleeve 41. The projecting end 44 of the sleeve 41 is pushed through a mounting hole of the movable contact member.

Thereafter, the projecting end 44 extending through the mounting hole is inserted into a first end of the spring 5 to be fixed thereon.

The thus obtained assembly is inserted into the cavity 12 of the housing 11 shown in FIG. 5 while the assembly is positioned in such a manner that the resilient engagement pieces 42, which serve to prevent the sliding sleeve 41 from slipping-off, are received in the grooves 14, as shown in FIG. 9 During this insertion, the projecting portions of the movable contact pieces 3 are retracted by being pressed inward against their resilience.

When the sloped surfaces of the resilient slip-prevention engagement pieces 42 slide on the sloped surfaces of the projections 13 at intermediate portions of the grooves 14, the resilient engagement pieces 42 retract inwardly by virtue of the formation of the slits 46. When the resilient slip-prevention engagement pieces 42 have cleared the projections 13, the horizontal surfaces of the projections 42 contact the horizontal surfaces of the projections 13. In this condition, the sliding sleeve 41 is prevented from slipping off the cavity 12, as shown in FIG. 9.

During this insertion, a projecting portion 12E at the center of the bottom 11C in the cavity 12 is inserted into a second end of the spring 5.

The stationary contact piece 2 shown in FIG. 1 is inserted from an insertion opening 12b of the housing 11 into the groove 12A. During this insertion, after the engagement pawl 21 has passed the insertion opening 12b, it recovers its original position to engage with the inner surface at the engagement stepped portion 12a, as shown in FIG. 4. By virtue of this engagement, the stationary contact piece 2 is mounted thereon not to be slipped off.

Thereafter, while the stationary contact piece 63 is brought into engagement with the groove 12B, the engagement pawls 61 of the conducive and resilient fixing pieces 6 are brought into engagement with the engagement holes 15. When the pawls 61 are pressed against the lower surface of the insulating base 1, as shown in FIG. 4, the frame 62 including the conductive and resilient fixing pieces 6 is fixed to the insulating base 1.

The push switch, assembled in this way without using any fixing means such as screws or soldering, is used after assuming the state shown in FIGS. 9 and 10, in which the housing 11 is inserted into a housing mounting hole 31 formed through a mounting plate 30 against the resilience of the conductive and resilient fixing pieces 6, and it is then held in place utilizing the resilience of the pieces 6.

Since the lower surface of the insulating base 1 defines a stepped portion 1A, a gap is formed between this lower surface and the upper surface of the mounting plate 30. The waterproof cap 7 may be fitted around the insulating base 1 with the outer edge of the cap 7 filling the gap. If the cap 7 is used, the self-resetting push switch is waterproof.

The self-resetting push switch according to the present invention is a normal closed switch. In its normal state shown in FIG. 11, the movable contact pieces 3 are kept in contact with the stationary contact piece 2 and the stationary contact piece 63.

Figure 12:
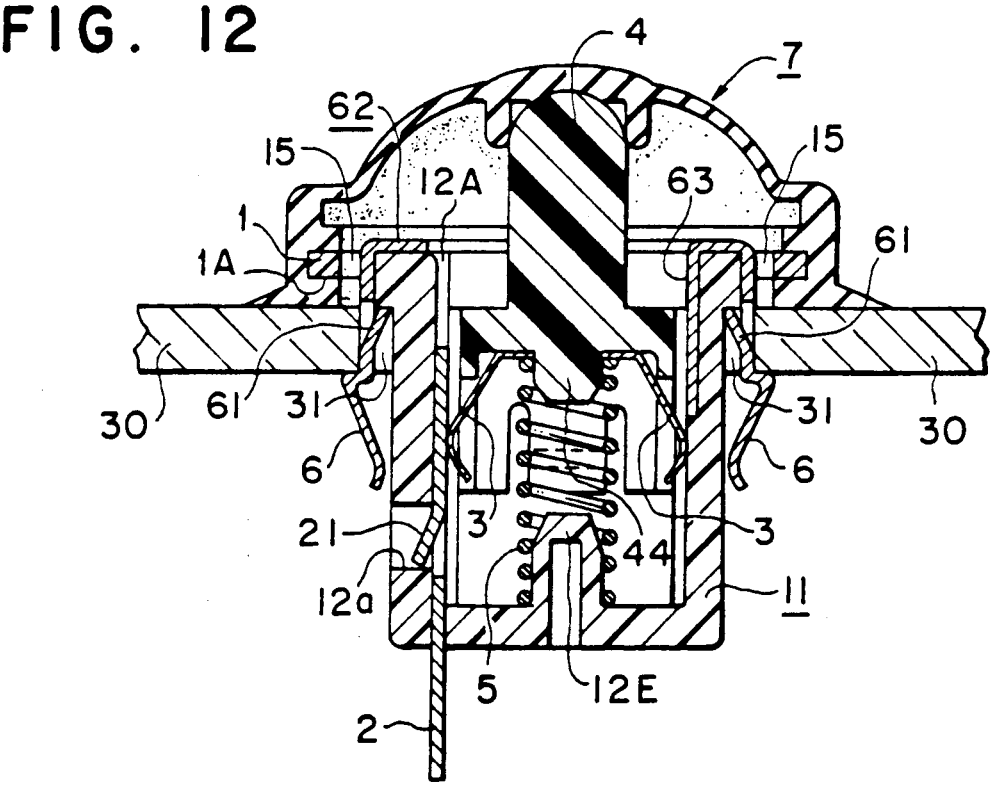
FIG. 12 is an enlarged section showing a state different from that shown in FIG. 11.

If the push switch is to be used as a door switch of a vehicle, the negative terminal of the battery is connected to the chassis serving as the housing mounting plate 30, while the positive terminal of the battery is connected through the associated door lamp to the stationary contact piece 2. With this arrangement, when the door is opened, the door lamp is turned on. When the door is closed, the door lamp is turned off because, as shown in FIG. 12, the operation rod 4 is pushed into the cavity 12 of the housing 11 against the force of the spring 5, causing the movable contact piece 3 to be released from its contact with the stationary contact piece 63 which extends through about one half of the depth of the cavity 12.

In the above described example, the first stationary contact piece 2 may be substituted by the tab terminal 10 (shown in FIG. 1) provided with a lead 9.

The present invention having the above-described arrangement provides the following advantages.

When a self-resetting push switch as described above is to be assembled or when it is to be actually mounted onto, e.g., the body of a vehicle, the switch can be assembled or mounted by fitting its various component parts into others or by fitting it into a suitable portion, without requiring any fixing means such as screws or soldering. Such fitting is advantageous in that the total number of the component parts as well as the total number of assembly or mounting processes can be reduced thereby enabling reduction in production cost. Furthermore, since the assembly or mounting can be automated, mass production is possible. In addition, after the push switch has been assembled, the spring 5 and the operation rod 4 are held within the housing 11 by the resilient engagement pieces 42, and the operation rod 4 is prevented from slipping off. This means that the conductive and resilient fixing pieces 6 can be assembled onto the insulating base 1 at a separate location, thereby making it possible to divide the entire assembly processes. In this case, assembly work can be performed in narrow places, and it is possible to avoid contamination of the switch contact portions by substances, such as dust, which might hinder electrical contact. Another noteworthy feature of the present invention is that the second stationary contact piece 63, among said two stationary contacts, is formed to be integral with the conductive and resilient fixing pieces 6. This enables grounding of e.g. the body of the vehicle to be achieved through the conductive and resilient fixing pieces 6, without requiring the contact piece 63 to be fixed to the body by screws.

If the push switch includes a flexible waterproof cap 7 disposed around the outer edge of the housing 11, the push switch serves as a waterproof self-resetting push switch.

Connection with an external circuit can be facilitated by substituting the stationary contact piece 2 with a tab terminal 10 having a lead 9.

What is claimed is:

1. A self-resetting push switch comprising:
   an electrically insulating housing having a bottom surface establishing a closed end of said housing, and an open end opposite said closed end, and first and second pairs of opposing inner wall surfaces extending from said bottom surface;
   a pair of first grooves formed on respective ones of said first pair of opposing inner wall surfaces;
   a second groove formed on at least one of said second pair of said opposing inner wall surfaces, said second groove having a projection formed therein;
   a first stationary contact piece inserted in one of said first grooves;
   an operation rod having an integral sliding sleeve defining a lower surface, and first and second movable contact pieces projecting outwardly from said sliding sleeve, said first movable contact piece being capable of coming into sliding contact with said first stationary contact piece, said sliding sleeve having at least one engagement piece engageable with said projection within said second groove;
   a spring interposed between the bottom surface of said housing and the lower surface of said sliding sleeve, and spring urging said operation rod in a direction which causes a part of said operation rod to project outwardly from said housing; and
   a frame having a pair of conductive and resilient fixing piece, and a second stationary contact piece capable of coming into sliding contact with said second movable contact piece, wherein
   said frame is coupled to an upper portion of said housing such that said pair of conductive and resilient fixing pieces are disposed on opposing side portions of said housing.

2. A self-resetting push switch according to claim 1, further comprising a flexible waterproof cap in covering relationship with the upper portion of said housing in such a manner as to cover said open end of said housing.

3. A self-resetting push switch according to claim 1 wherein said first stationary contact piece comprises a tab terminal having a lead.

4. A self-resetting push switch comprising:

an open-ended housing having interior side wall surfaces which define an interior cavity;

a push rod having an upper portion which extends outwardly from said open end of is housing, and mounted within said interior cavity of said housing for reciprocal movements between active and inactive positions, said push rod carrying first and second contacts which are movable with said push rod between said active and inactive positions thereof;

a first stationary contact extending into said interior cavity of said housing and positioned along a respective one of said interior side wall surfaces such that said first movable contact of said push rod is capable of being moved into sliding contact therewith;

a frame having (i) a pair of resilient fixing pieces adapted to coupling said housing to a base member, and (ii) a second stationary contact, wherein said frame is coupled to said housing such that said resilient fixing pieces are positioned on opposite exterior sides of said housing, and such that said second stationary contact extends into said interior cavity of said housing and is positioned along another respective one of said interior side wall surfaces such that said second movable contact is capable of being moved into sliding contact therewith; wherein said first and second movable contacts are in sliding electrical contact with said first and second stationary contacts, respectively, when said push rod is in said active position thereof so as to be capable of making an electrical circuit, and wherein at least one of said first and second movable contacts is separated from said first and second stationary contacts, respectively, when said push rod is in said inactive position thereof so as to be capable of breaking an electrical circuit.

5. A push switch as in claim 4, wherein said housing includes at least one groove formed in a respective one of said interior side wall surfaces, and a projection member positioned within said groove which establishes a limit of movement of said push rod; and wherein said push rod includes at least one resilient engagement piece engageable with said at least one projection member.

6. A push switch as in claim 5, wherein said projection member includes an upper sloped surface, and a lower horizontal surface.

7. A push switch as in claim 4, further comprising spring means acting upon said push rod for urging said push rod in a direction whereby a greater extend of said portion of said push rod extends from said housing.

8. A push switch as in claim 4 or 7, further comprising a flexible waterproof cap in covering relationship with said open end of said housing.

* * * * *